P. W. MACKENZIE.
Furnace for Producing Gases for Heating and other Purposes.

No. 201,808.  Patented March 26, 1878.

Witnesses
John Becker
Theo. Haynes

Inventor
P. W. Mackenzie
by his Attorneys
Brown & Allen

UNITED STATES PATENT OFFICE.

PHILIP W. MACKENZIE, OF BLAUVELTVILLE, NEW YORK.

IMPROVEMENT IN FURNACES FOR PRODUCING GASES FOR HEATING AND OTHER PURPOSES.

Specification forming part of Letters Patent No. 201,808, dated March 26, 1878; application filed May 25, 1877.

*To all whom it may concern:*

Be it known that I, PHILIP W. MACKENZIE, of Blauveltville, in the county of Rockland and State of New York, have invented certain new and useful Improvements in Furnaces for Producing Gases for Heating and other Purposes, of which the following is a description, reference being had to the acccompanying drawing, which forms part of this specification.

This invention has more particularly for its object the production of gases for heating purposes; and it relates to furnaces for producing a mixture of hydrogen, carbonic-oxide, and nitrogen gases by the combustion of carbon with atmospheric air and the gases resulting from the decomposition of water, in accordance with a process which will be hereinafter described.

The invention consists in a furnace of a particular construction as regards its details and combinations of its parts, or certain of them, whereby great efficiency is obtained in carrying out said particular process, and cheapness of construction is combined with durability of the furnace.

The particular process above referred to consists, generally, in simultaneously injecting steam and air through one or more heating passages or spaces to a combustion-chamber containing carbonaceous fuel, up through which, while said fuel is in a state of combustion, the heated steam and air are passed, forming at the base or lower portion of the combustion-chamber, by the combining of the oxygen of the air and the oxygen of the water with the carbon, carbonic acid, nitrogen, and hydrogen, which gases, as they continue to pass up through the incandescent carbon, are ultimately converted, by the carbonic acid taking up additional carbon, into carbonic-oxide, hydrogen, and nitrogen gases. But this is not claimed in this application, it being the subject of a separate application for patent filed of even date with this application.

The furnace which is the subject of this invention comprises an outer case or shell, an inner combustion-chamber, arranged to leave an annular or continuous space between it and the shell, a steam and air injector for simultaneously passing steam and air to the upper portion of said space, and a series of flanged projections, forming a circuitous channel down and around the combustion-chamber, for imparting additional heat to said current of combined steam and air, and for conducting the same to the bottom of the combustion-chamber.

Figure 1:
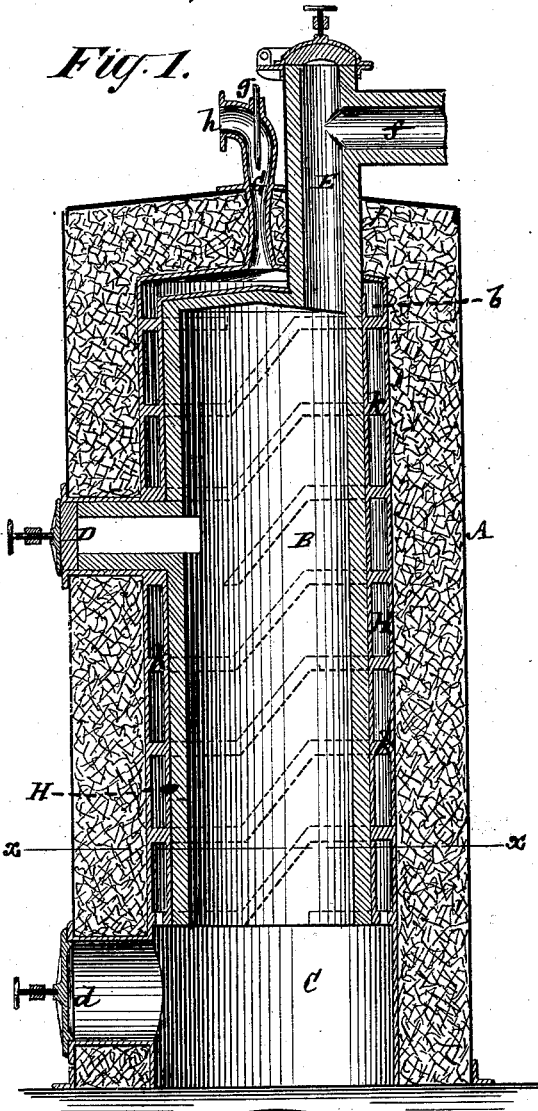
Figure 3:
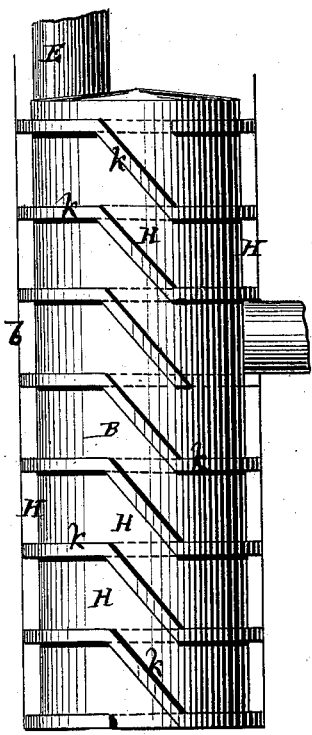
Figure 2:
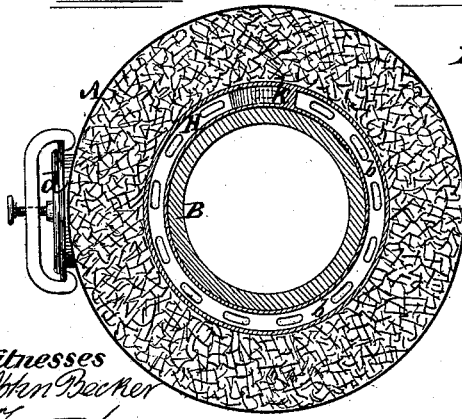

Figure 1 represents a vertical section of my improved furnace or apparatus, and Fig. 2 a horizontal section thereof on the line *x x*. Fig. 3 is an exterior elevation of the combustion-chamber in its relation with the outer case or shell.

A is the outer case or shell of the furnace, which is an upright and close one. Said shell may be made mainly of brick or any suitable refractory and non-conducting material, lined and sheathed or not, as desired, with metal.

B is the inner combustion-chamber, which, when the outer case A is of circular form in its transverse section, is also cylindrical, and is arranged concentrically within said case, leaving an annular space, *b*, between it and the case, which space is extended above the closed top of the combustion-chamber. This combustion-chamber B may also be of metal lined with brick or other refractory and non-conducting material, or may be wholly of a refractory material, in which latter case it will be most convenient to build it up in sections.

C is the ash-pit, down to or within which the bottom of the combustion-chamber projects, and which is provided with a door, *d*. Said combustion-chamber may or may not be provided with a grate at its base, and also may or may not be furnished with a side passage and door, D, for charging it with coal or other carbonaceous fuel. When not thus furnished, however, with a side passage and door, the combustion-chamber may be supplied with fuel through an upper passage, E, which is closed by lid or door at its top, and forms the outlet, through a branch, *f*, for the resulting gases.

Connecting with the space between the top of the combustion-chamber B and the outer case or shell A is a combined steam and atmospheric-air injector, G, the steam entering by an interior jet-pipe, *g*, and the air by a surrounding inlet or pipe, *h*. Around the exterior of the combustion-chamber B are a series of flanged projections, k, which may run or be arranged in alternately horizontal and alternately downwardly-inclining directions, to facilitate construction when of brick, and to retard the current. These flanged projections form a continuous and prolonged or circuitous channel, H, within the annular space b, to conduct the steam and air entering from above to the bottom of the combustion-chamber B.

The heat derived from the interior combustion-chamber B serves to impart a gradually-increasing heat to the combined steam and air as they pass through the channel H to the base of the combustion-chamber, up through the burning carbonaceous fuel, in which chamber said heated air and steam are passed, first forming at the base of said chamber B carbonic acid, nitrogen, and hydrogen, which gases, as they pass through the incandescent carbon in the chamber B, are ultimately converted into carbonic-oxide, hydrogen, and nitrogen gases, that escape by or are drawn off through the branch f, for use as required.

I claim—

The combination of the close outer case A, the inner combustion-chamber B, the interposed circuitous channel H, formed by flanged projections k, the steam and air injector G, and the outlet E for the resulting gases, essentially as shown and described.

P. W. MACKENZIE.

Witnesses:
FRED. HAYNES,
EDWARD B. SPERRY.